Figure 1:
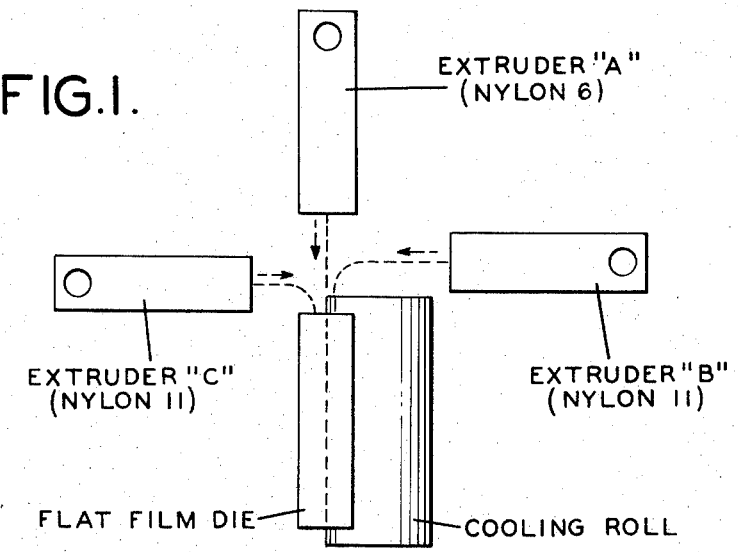

:# United States Patent [19]

Bhuta et al.

[11] 3,762,986

[45] Oct. 2, 1973

[54] POLYAMIDE COMPOSITE FILM

[75] Inventors: Mahendra Bhuta, Mendham; William Sacks, Gillette, both of N.J.

[73] Assignee: Allied Chemical Corporation, New York, N.Y.

[22] Filed: Feb. 26, 1971

[21] Appl. No.: 119,300

[52] U.S. Cl. ........... 161/227, 99/171 LP, 117/76 F, 117/138.8 N, 117/161 P, 156/331
[51] Int. Cl. .................... B32b 27/34, C08j 1/42
[58] Field of Search ............... 99/171 LP; 117/76 F, 117/138.8 N, 161 P; 161/227; 156/331; 264/171

[56] References Cited
UNITED STATES PATENTS 3,476,627   11/1969   Squires ............................. 156/244
3,399,108   8/1968   Olson ................................. 161/173
3,458,378   7/1969   Ambros et al. ...................... 156/244
3,473,956   10/1969   McIntyre et al. ............. 117/138.8 N Primary Examiner—Alfred L. Leavitt
Assistant Examiner—Robert A. Dawson
Attorney—Jonathan Plaut

[57] ABSTRACT

Composite films comprising at least one polyamide having a melting point above about 200° C having affixed to at least one of its surfaces a polyamide having a melting point below about 200° C and a moisture permeability below about 10 grams/100 in$^2$/24 hr. per mil thickness are provided which exhibit an excellent balance of properties including high strength, clarity and low moisture and gas permeability.

11 Claims, 5 Drawing Figures

POLYAMIDE COMPOSITE FILM

This application relates to novel composite films and to a process for the production thereof. More particularly, this invention relates to composite films comprising at least one polyamide having a melting point above about 200° C having affixed to at least one of its surfaces a polyamide having a melting point below about 200° C and a moisture permeability below 10 grams/100 in $^2$/24 hr. per mil thickness.

The desired properties for transparent packaging film are well known. They include strength, heat-sealability, durability of the heat seal as well as durability of the complete film and low permeability to moisture and gases, particularly oxygen and carbon dioxide. In addition to low permeability and those properties named above, such film should also desirably be easily thermoformable, of such a degree of transparency and gloss as to give an eye-appealing view of the item wrapped therein and the various layers comprising the film must not separate from each other. Additionally, where the package is to be subjected to extreme conditions, for example, as a package for heat-in-the-bag foods, the film must possess good heat sealing characteristics as well as the ability to withstand extended exposure to elevated temperatures and high moisture environments.

It is possible to prepare nylon film having the advantageous properties of high strength, toughness and clarity. However, nylon has several drawbacks which make its utilization less than ideal. In addition to being relatively costly, it usually has a relatively high monomer content which presents processing problems since invariably the monomer tends to deposit during processing giving rise to stick marks, transfer of deposits to the film, etc. Additionally, for some applications, nylon films have had inadequate heat seal characteristics. These drawbacks have limited the use of nylon films for packaging and like applications.

It is an object of this invention to provide composite nylon films and an improved method for the production thereof.

It is a further object of this invention to provide novel nylon composite films characterized by excellent clarity, gloss, high strength, low gas and moisture permeability, improved heat seal properties and firm interlayer bonding.

These and other objects will be apparent from the description of the invention which follows.

The novel films of this invention possess an excellent balance of the desired properties mentioned above and comprise, broadly, at least one polyamide having a melting point above 200° C, preferably within the range of about 210° C to about 300° C, said polyamide having adhered to at least one of its surfaces a polyamide having a melting point below about 200° C., preferably within the range of about 150° C to about 195° C, and a moisture permeability below 10 grams/100 in $^2$/24 hr./mil thickness.

For convenience and for ease of illustration, such composites include those illustrated as —A/B/A—, —A/B— and —B/A/B— wherein A represents a polyamide having a melting point below 200° C, for example Nylon 11 (poly-11-undecanoamide), Nylon 12, etc. and B represents a polyamide having a melting point above 200° C, for example Nylon 6 (polycaproamide), Nylon 6,6 (polyhexamethylene adipamide), Nylon 6, 10, etc.

The composite films of the invention are the ribbon or flat-sheet type and are produced, preferably, by a method which comprises simultaneously extruding melts of the various polyamides through a common flat film die employing two or alternatively three extruders withdrawing the resultant melt extrudates from the die to contact a cooling means whereby said extrudate is drawn and cooled to form a composite film, said polyamide having been positioned within said die so that as the extrudates exit the die, the higher melting polyamide is in contact with the atmosphere and the lower melting polyamide is in contact with said cooling means.

Referring to the drawings,

FIG. 1 is a schematic arrangement of suitable apparatus employed to prepare the composite films of this invention. As illustrated, three extruders feed a common flat film die. Extruder A delivers a polyamide melting above 200° C, for example Nylon 6, while extruder B (and optionally extruder C) delivers a polyamide melting below 200° C, for example Nylon 11. (It will be understood that two to three extruders may be employed to deliver either of the different polyamides to prepare the different composite films illustrated above.) The extrudate exiting the die is contacted with a cooling means, preferably, a cooling roll, which draws the melt to the desired ratio and delivers the cooled composite to a windup roll.

Figure 2:
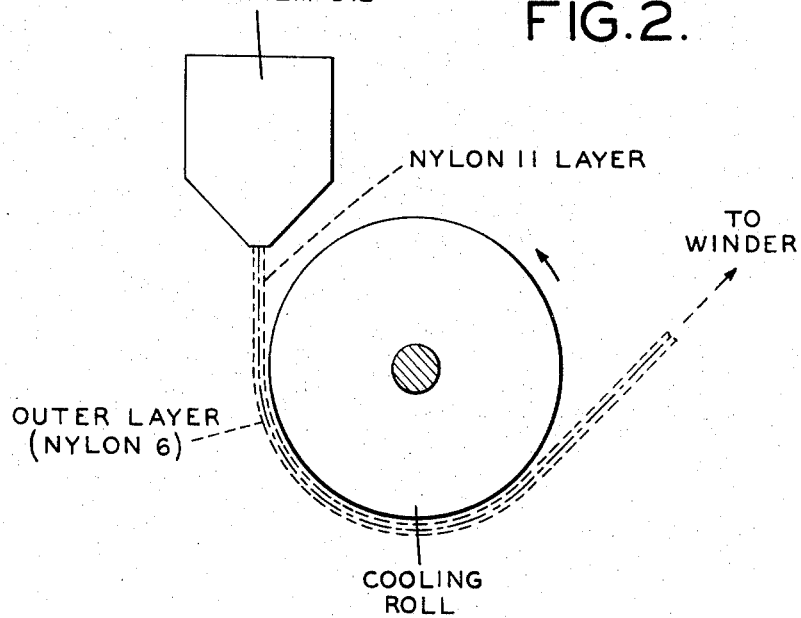

FIG. 2 is a schematic view of the melt streams exiting the die to contact the cooling roll.

The placement of the individual melt extrudates exiting the die with respect to the cooling roll is an important feature of the process and constitutes a preferred embodiment thereof. In the instance where films of the type A/B or A/B/A are prepared, the lower melting polyamide is positioned to contact the cooling roll and the higher melting polyamide to contact the atmosphere. This arrangement provides several advantages. Higher melting polyamide, hereafter referred to as Nylon 6, is kept out of contact with the cooling roll thereby avoiding deposition of monomer invariably present, the problem of stick marks, transfer of deposits to the films, etc. and accomplishing a more rapid rate of crystallization of the Nylon 6 layer by reducing the rate of cooling of this layer. More rapid crystallization of the Nylon 6 layer conveys improved properties to this component, e.g. both stiffness and strength are increased. Additionally, the arrangement permits further treatment of the higher melting polyamide layer concurrently with the cooling of the lower melting polyamide layer in the case of composites of the type A/B. In a preferred embodiment herein, while said lower melting polyamide is in contact with the cooling roll, the higher melting polyamide is directly exposed to steam or other high relative humidity atmosphere to induce moisture pick-up which further promotes rapid crystallization and, thus, higher strength and stiffness to this layer.

Films of the type B/A/B, although not the preferred film, may also be produced by this invention in the same manner outlined above except that higher temperatures are employed in the cooling roll to avoid deposition of the monomer on the cooling roll.

The placement of exiting streams and variations of flow channels of the die is disclosed in greater detail in our copending application Ser. No. 119,325, now U.S. Pat. No. 3,697,368 entitled "Polyamide-Polyethylene Composite Film" filed of even date herewith which disclosure is incorporated herein by the foregoing reference.

Figure 3:
Figure 4:
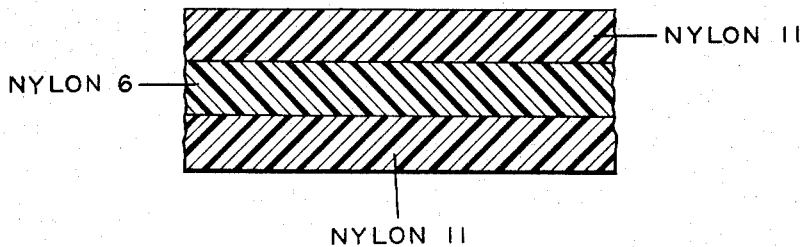
Figure 5:
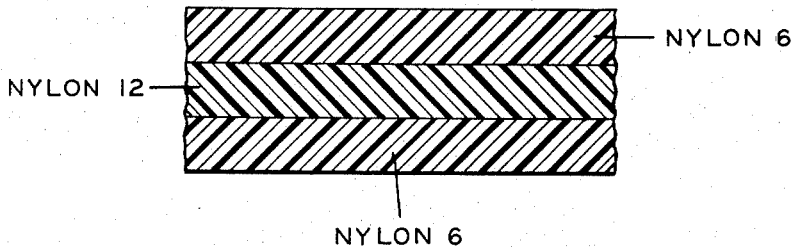

Films produced by the invention are illustratively shown in FIGS. 3 to 5.

In FIG. 3, the film comprises a two-ply composite of a higher melting polyamide (Nylon 6) bonded to a lower melting polyamide (Nylon 11) and is of the type A/B.

In another specific embodiment, illustrated in FIG. 4, the film is a three-ply composite of the type A/B/A wherein A is Nylon 11 and B is Nylon 6.

In FIG. 5, a film of the type B/A/B is illustrated wherein A is Nylon 12 and B is Nylon 6.

Films of the type illustrated in FIGS. 3 and 4 wherein A is Nylon 11 or Nylon 12 and B is Nylon 6 or Nylon 6,6 are especially preferred herein.

The length and width of the films of this invention are dictated by the intended usage and the films may vary from narrow tapes to wide sheeting.

Thicknesses of the various layers as well as of the composite may also vary as desired. The films may vary from about 0.2 to 100 mils, preferably 1 to 5 mils in thickness. Similarly, the various layers may vary from about 0.1 to 50 mils, preferably 0.75 to 2 mils in thickness.

Processing conditions employed in the extruders, flat film die and cooling roll are also subject to variation.

Extruder temperatures for the various components are preferably as follows:

Extruder A-Nylon 6, Temperature 430°F to 575°F, preferably 460°F to 500°F.

Nylon 6,6–520°F to 600°F, preferably 525°F to 550°F.

Extruder B-Nylon 11, Nylon 12, etc.

Temperature 360°F to 500°F, preferably 400°F to 460°F.

Coextrusion Die

Temperature — 450°F to 575°F, preferably 500°F to 525°F.

Cooling Roll Temperature – 60°F to 300°F.

For composites of type B/A/B–150°F to 250°F.

To illustrate the practice and advantages of this invention, typical film were prepared and measurements made of their pertinent characteristics.

EXAMPLE 1

A three-ply composite having a total thickness of 1.5 mil comprising 0.25 mil Nylon 12 bonded on each side of 1 mil of Nylon 6 was prepared employing the equipment outlined in FIG. 1.

Extruder A had a 2 ½ inch diameter barrel heated at 460° F to 500° F and delivered Nylon 6 melt at a screw speed of 26 rpm.

Extruders B and C had a 1 inch diameter barrel heated at 410°F to 500°F and delivered Nylon 12 melt at a screw speed of 60 rpm.

The three melt streams were passed to one end of the coextrusion die, operated at 500° to 525° F and having a 24-inch length exit slit orifice, where they were combined in a common manifold and exit the die through the common slit orifice. Upon exiting the die, the composite tri-layer melt was passed over a cooling roll consisting of an 18 inch diameter chrome plated roll maintained at a temperature of 125° F and rotating at a surface speed of 60 feet per minute. The cooled and drawn composite was then passed to wind-up.

The resultant composite was a tough film characterized by exceptional clarity and gloss, high strength and low gas and moisture permeability. More specifically, the film exhibited the following properties: Tensile strength (psi) 13,000; Ultimate elongation-270 to 350 percent; oxygen transmission-2.4 CC/100 in $^2$/24 hours; Haze-1.5 percent and Gloss-117. The film when sealed at 350° F, ¼ second contact time and 20 psi had a seal strength (breaking strength) of 2.6 lbs/in. in peel. In addition, the film shows improved heat sealing and moisture transmission properties when compared to a film prepared from straight Nylon 6 in that the film could be heat sealed to a temperature 30° F below that required for Nylon 6 and moisture transmission is three times higher when employing Nylon 6 of comparable thickness. These improvements may be seen from the following:

| Property | Nylon 12/Nylon 6/Nylon 12 Composite Film | Nylon 6 Film |
|---|---|---|
| Minimum Sealing Temperature | 350° F | 380° F |
| Moisture Transmission g/100 in $^2$/24 hour | 4.5 | 13 |

It can thus be seen from the above example, that composite films of the invention offer advantages of Nylon 6 film, particularly in applications requiring lower heat sealing temperatures; applications requiring low gas permeability combined with lower moisture transmission and in applications requiring films more resistant to high moisture environments.

EXAMPLE 2

Employing the same procedure and equipment employed in Example 1, the following composite films were prepared:

A. Nylon 11/Nylon 6/Nylon 11
Thicknesses: 0.15 mil/0.9 mil/0.15 mil
Total Thickness – 1.2 mils B. Nylon 12/Nylon 6
Thicknesses: 1.5 mil/1.5 mil.
Total Thickness - 3 mils C. Nylon 11/Nylon 6,6
Thicknesses: 1.5 mil/1.5 mil
Total Thickness: 3 mils D. Nylon 6/Nylon 11/Nylon 6
Thicknesses: 0.25 mil/1 mil/0.25 mil
Total Thickness: 1.50 mil In preparing Film D, the procedure was varied in that the cooling roll temperature was maintained at a temperature of 200°F.

All of films A to D were heat sealable, clear, glossy, tough films with specific properties comparable to those of the composite prepared in Example 1.

In the above examples Ultimate Elongation and Tensile Strength were obtained per ASTM–D882–61T, Method A; percent Haze per ASTM–D1003–61, Procedure A and Gloss was measured by the use of a Gardner Glossometer at a 20° angle. The value indicates the reflectance of the film. Transmission rates were determined by mounting the film sample in a volumetric gas transmission cell as described in U.S. Pat. No. 3,514,367.

It can be seen from the above examples that novel composite films having the requisite properties for packaging applications have been prepared and such films exhibit improved properties over similar prior art films.

We claim:

1. A composite film comprising A. at least one layer of a polyamide having a melting point above about 200°C having affixed to at least one of its surfaces B. a layer of a polyamide having a melting point below about 200°C and a moisture permeability below 10 grams/100 in.$^2$/24 hours per mil thickness.

2. A composite film as claimed in claim 1 wherein said polyamide A) has a melting point within the range of about 210° C to about 300° C.

3. A composite film as claimed in claim 2 wherein said polyamide A) is selected from the group consisting of polycaproamide and polyhexamethylene adipamide.

4. A composite film as claimed in claim 1 wherein said polyamide B) has a melting point within the range of about 150° C to about 195° C.

5. A composite film as claimed in claim 4 wherein said polyamide B) is selected from the group consisting of poly-11-undecanoamide and poly-12-dodecanoamide.

6. A composite film comprising a layer of polycaproamide having affixed to at least one of its surfaces a layer of a polyamide selected from the group consisting of poly-12-dodecanoamide and poly-11-undecanoamide.

7. A composite film as claimed in claim 6 wherein said polyamide is poly-12-dodecanoamide.

8. A composite film as claimed in claim 6 wherein said polyamide is poly-11-undecanoamide.

9. A composite film as claimed in claim 7 wherein said poly-12-dodecanoamide is affixed to both surfaces of said polycaproamide.

10. A composite film as claimed in claim 8 wherein said poly-11-undecanoamide is affixed to both surfaces of said polycaproamide.

11. A composite film comprising poly-11-undecanoamide or poly-12-dodecanoamide having polycaproamide affixed to both surfaces thereof.

* * * * *